(No Model.)
L. S. FLATAU.
CULTIVATOR AND SEEDER.
No. 406,205. Patented July 2, 1889.
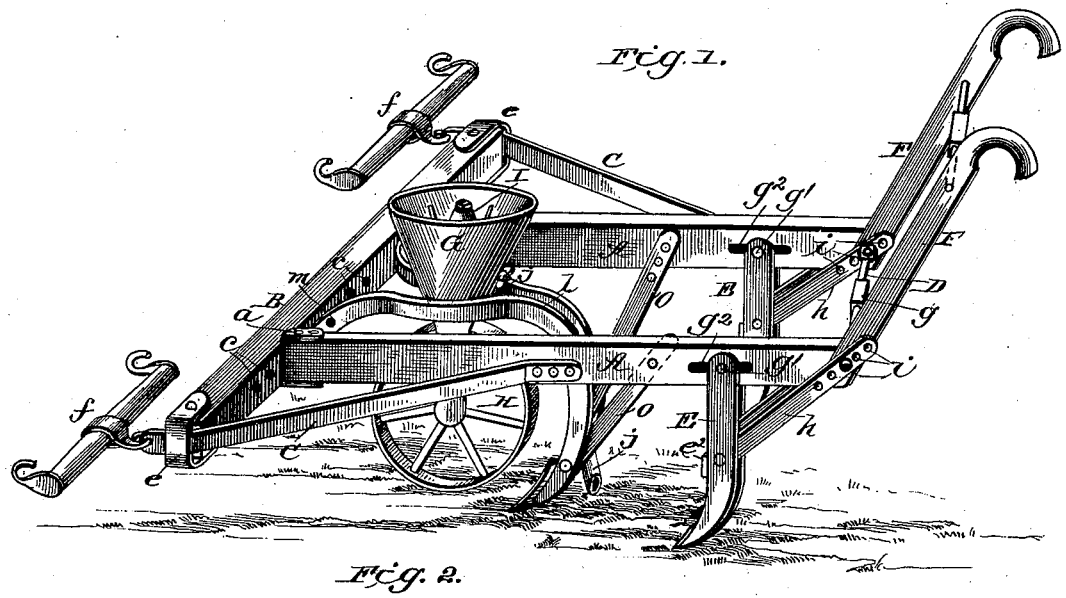
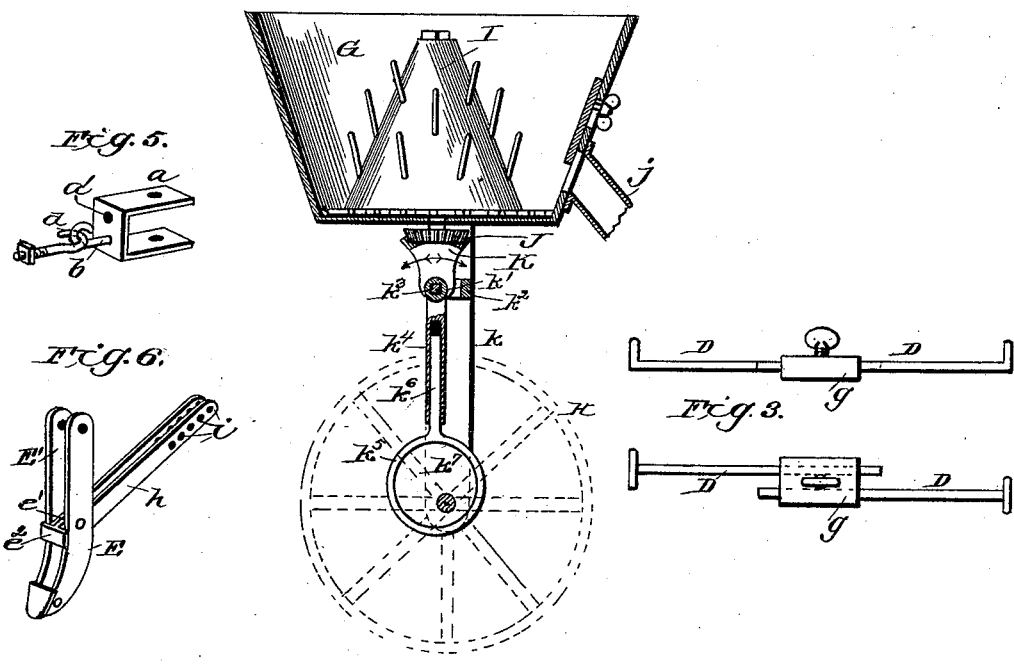
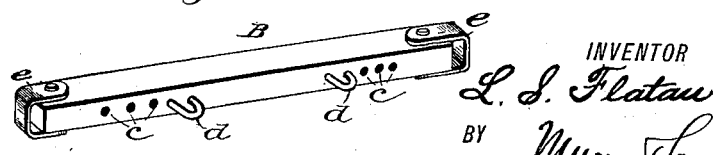
WITNESSES:
INVENTOR
L. S. Flatau
BY Munn & Co
ATTORNEYS

UNITED STATES PATENT OFFICE.

LOUIS S. FLATAU, OF PITTSBURG, TEXAS.

CULTIVATOR AND SEEDER.

SPECIFICATION forming part of Letters Patent No. 406,205, dated July 2, 1889.

Application filed July 10, 1888. Serial No. 279,580. (No model.)

*To all whom it may concern:*

Be it known that I, LOUIS S. FLATAU, of Pittsburg, in the county of Camp and State of Texas, have invented a new and useful Improvement in Combined Cultivator and Seeder, of which the following is a specification.

This invention contemplates certain improvements in combined cultivators and seeders, having for its object to greatly simplify the organizing and assembling of the parts, while expediting the adjustment of the same and rendering the invention interchangeable as a cultivator and a seeder; and to these ends the nature of the invention consists of the sundry combinations of parts, including their construction, substantially as hereinafter more fully set forth, and pointed out in the claims.

In the accompanying drawings, Figure 1 is a perspective view of my improved cultivator with seeding attachment. Fig. 2 is a sectional elevation, with the seed-dropping-mechanism-operating wheel in dotted lines, of the seeding attachment; and Figs. 3, 4, 5, and 6 are detail views of the cultivator.

In carrying out my invention I employ two beams or side bars A A, each of which is provided at its forward end with a clip $a$, having a series of apertures $a'$ in its forward end, one arranged above the other. These apertures receive and permit of the vertical adjustment of hooked bolts $b$, the hooks of which extend forwardly of the clips, while the shanks are provided with screw-threads fitted with nuts for securing the same to the clips. This adjustment of the bolts $b$ regulates the depth of penetration of the plow.

B is a cross-bar or yoke, which is provided with series of adjusting-apertures $c$ $c$, one series being arranged near each end, and each adapted to receive a hooked bolt $d$, which has its hook projecting rearward and engaging or connecting with the hooked bolts $b$, thus effecting a connection between the cross-bar or yoke and the side bars or beams A. The series of apertures $c$ permit of the adjustment of the side bars or beams A closer together or farther apart, as may be desired.

C C are two side draft-bars, which are secured at their rear ends to the side bars or beams A, while from that point they are extended obliquely outward and forward and passed through clips $e$ $e$, fastened to the ends of the cross-bar or yoke B, said draft-bars being adapted for the connection thereto of the whiffletrees $f f$.

D D are two extensible rods, which adjustably connect the side bars or beams A at their rear ends, the outer ends of the rods connecting with said beams or side bars, while the rods are themselves connected together by a sliding coupling $g$.

E E are standards which are adjustably pivoted or connected at their upper ends to the beams or side bars A, near their rear ends, by means of pivot-bolts $g'$ passing through the same and slots $g^2$ in said beams or side bars, and which standards are adapted to have applied to their front sides at the lower ends plows or shovels for cultivating purposes. The plow or shovel standards E E are each braced in position by means of double oblique bars or braces $h$ $h$, preferably connected at their lower ends to the standards by a bolt, upon which is fitted between the lower ends of said braces a casting E', consisting of an eye $e'$ and a plate $e^2$, which rests against the front edges of said standards to hold the latter in proper relative position. The double braces $h$ $h$ are each provided near their outer ends with series of adjusting-apertures to permit, with the aid of hand-bolts, of the adjustment of the standards at the required angle of inclination.

F F are the handles, which are secured to the rear ends of the beams or side bars A A, the fastening thereof being made more secure by passing therethrough the hand-bolts connecting the braces $h$ to said beams or side bars.

G is the seed-hopper, which is provided with a discharge spout or tube $j$ to conduct the contents of said hopper to the ground. This hopper is also provided with pendants or downwardly-extending portions $k$, between which is journaled a wheel H, traveling along the ground. The hopper G is supported upon curved bars $l$, having their forward ends connected to the cross-bar or yoke B by the same bolts $d$ as effect the connection of the crossbar or yoke to the beam hook-bolts, the connection being adjustably effected by the passage of the bolts through the series of apertures $m$ in each of said curved bars $l$ and the series of apertures $c\,c$ in the cross-bar or yoke. This adjustment, it is obvious, is necessary in effecting the adjustment of the side bars or beams A. The rear downwardly-curved portions of the bars $l$ converge at their lower ends and have applied thereto a plow $l'$ to open a furrow in the previously-plowed ground for the reception of the seed falling from the spout or tube $j$. The lower ends of the curved hopper-supporting bars $l$ are braced in position by means of divergent obliquely-disposed braces or bars $o\,o$, fastened at their lower ends to the rear portions of the curved bars $l$ and at their upper ends by suitable bolts to the inner sides of the beams or side bars A A.

Within the hopper G is arranged the seed agitator or stirrer I, to aid in delivering the seed to the tube $j$ through the discharge-opening in said hopper. The agitator or stirrer receives a semi-rotary or oscillatory movement to effect the agitation and discharge of the seed from the hopper by means of mechanism which will now be described.

J is a beveled pinion or cog-wheel on the lower end of the shaft of the stirrer or agitator I, with which engages or meshes a segmental cog-wheel or rack K. The rack or segmental cog-wheel K is secured upon a sleeve $k'$, fitted and held upon a squared or angular shaft $k^3$, supported in cross-bars $k^2$, connected to the pendants $k$. The sleeve $k'$ is provided with a hollow arm $k^4$, which is telescoped by a rod or arm $k^6$ of a ring or collar $k^5$, embracing an eccentric $k^7$, secured to the shaft of the transporting and driving wheel H.

In lieu of the straight yoke or cross-bar, an inverted-U-shaped one may be used when needed.

This invention is adapted to "break" land "broadcast" with turning-shovels or turning-plows. It will prepare land, "bed" it, and plant it at the same time. Then the seeder or planter can be readily detached and the "crop" cultivated with any kind of plow desired. It is very strong and light, needing no break-pins, and may be converted into two single "stock" or standard cultivators. In lieu of the side draft-bars C C, chains may be used.

Having thus fully described my invention, what I claim, and desire to secure by Letters Patent, is—

1. The combination, with the side bars or beams suitably connected together at their rear ends and at their forward ends by a cross bar or yoke provided at its ends with clips or staples, of the side draft-connections applied to said beams or side bars and passed through said clips and connected to single-trees, substantially as set forth.

2. In a combined planter and cultivator, the combination, with the bar B, having clips $e$ at its ends, and the parallel plow-beams A A, secured thereto at their forward ends, connected at their rear ends by a bar or rod, and provided with plow-standards, of the inclined bars C, secured at their rear ends to the said beams between the ends thereof and extending through the clips $e$, substantially as set forth.

3. In a combined wheel cultivator and planter, the combination, with the frame and plows, the hopper supported on the frame, and the oscillating agitator or stirrer in the bottom of the hopper, having a gear J, of the wheel-axle having an eccentric $k^7$, the ring or strap $k^5$, embracing the eccentric and having a rod $k^6$, and the rocking segment K, having a tubular arm $k^4$, receiving the rod $k^6$ to be oscillated thereby, substantially as set forth.

4. A combined cultivator and planter comprising the parallel plow-beams A A, the cross-bar B at the forward ends thereof, the plow-standards, the curved bars $l$, secured to the bar B between the standards, curved downward and provided with a plow, the braces O, connecting the bars $l$ with the beams A A, the hopper G, secured between the bars $l$ and having a chute $j$ and depending arms $k\,k$, the wheel H, having its axle journaled in said arms and provided with an eccentric $k^7$, the vertical conical stirrer or agitator in the bottom of the hopper and having inclined fingers, and a connected gear J below the hopper, the rocking segmental gear K, meshing with said gear J and having a depending arm $k^4$, and a ring $k^5$ on the eccentric provided with an arm or rod $k^6$, having a sliding connection with the arm $k^4$, substantially as set forth.

LOUIS S. FLATAU.

Witnesses:
W. A. RUSSELL,
J. W. BAILEY.